US011907657B1

(12) United States Patent
Kang et al.

(10) Patent No.: US 11,907,657 B1
(45) Date of Patent: Feb. 20, 2024

(54) DYNAMICALLY EXTRACTING N-GRAMS FOR AUTOMATED VOCABULARY UPDATES

(71) Applicant: Intuit Inc., Mountain View, CA (US)

(72) Inventors: Byungkyu Kang, San Diego, CA (US); Shivakumara Narayanaswamy, Mountain View, CA (US); Andrew Mattarella-Micke, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/217,523

(22) Filed: Jun. 30, 2023

(51) Int. Cl.
 *G06F 40/279* (2020.01)
(52) U.S. Cl.
 CPC ................... *G06F 40/279* (2020.01)
(58) Field of Classification Search
 CPC ............... G10L 13/02; G06F 40/279
 See application file for complete search history.

(56) References Cited

U.S. PATENT DOCUMENTS

| | | | | |
|---|---|---|---|---|
| 10,515,637 | B1* | 12/2019 | Devries | G10L 15/1822 |
| 11,735,178 | B1* | 8/2023 | Mars | G10L 15/08 |
| | | | | 704/251 |
| 2007/0073533 | A1* | 3/2007 | Thione | G06F 40/35 |
| | | | | 704/9 |
| 2010/0094835 | A1* | 4/2010 | Lu | G06F 16/951 |
| | | | | 707/E17.143 |
| 2013/0173610 | A1* | 7/2013 | Hu | G06F 16/951 |
| | | | | 707/E17.064 |
| 2016/0357851 | A1* | 12/2016 | Perkins | G06F 16/3329 |
| 2021/0304749 | A1* | 9/2021 | Singh | G06F 40/30 |
| 2023/0140125 | A1* | 5/2023 | Glesinger | G06F 40/279 |
| | | | | 704/9 |

OTHER PUBLICATIONS

Bennani-Smires, K. et al., "Simple Unsupervised Keyphrase Extraction using Sentence Embeddings", Sep. 5, 2018, 9 pages.

* cited by examiner

*Primary Examiner* — Mohammad K Islam
(74) *Attorney, Agent, or Firm* — Ferguson Braswell Fraser Kubasta PC

(57) ABSTRACT

Systems and methods dynamically extracting n-grams for automated vocabulary updates. Text is received. An n-gram extracted from the text is matched to a canonical n-gram from a vocabulary to identify a tag for the text. An n-gram weight is computed for the n-gram extracted from the text. The n-gram weight may be computed by adjusting a term frequency of the n-gram. A relevancy score is computed for the tag using the n-gram weight and using an n-gram frequency of the canonical n-gram. The relevancy score is computed by dividing the n-gram weight by a value proportional to the n-gram frequency of the canonical n-gram. The relevancy score of the n-gram is presented.

20 Claims, 11 Drawing Sheets

DYNAMICALLY EXTRACTING N-GRAMS FOR AUTOMATED VOCABULARY UPDATES

BACKGROUND

As end users interact with systems over time, different keywords are used in the conversations and search queries processed by the systems. Users monitoring the systems may be alerted to the usage of certain keywords. Based on the keywords alerted to the users monitoring the system, actions may be performed. For example, a user at a call center may monitor the conversations of the call center. When certain keywords are identified in real time, actions may be performed including intervention by the user into a conversation.

Keywords, which may be stored in vocabularies, are words or phrases used to identify relevant data in text for machine learning models. Keywords may be used to identify pertinent words or phrases in a given string of text, as well as to identify topics, themes, and patterns within the text. Using keywords, machine learning models may more effectively process and analyze text by focusing on keywords. The relative pertinence or weights of different keywords may change over time. For example, as laws change, the relative weights of certain keywords may increase or decrease based on the changes to the laws such that keywords from conversations for recent conversations may not be the same as keywords for conversations for conversations from last month, last quarter, last year, etc. A challenge is to develop automated systems that automatically update vocabularies with relevant keywords.

SUMMARY

In general, in one or more aspects, the disclosure relates to a method that dynamically extracts n-grams for automated vocabulary updates. Text is received. An n-gram extracted from the text is matched to a canonical n-gram from a vocabulary to identify a tag for the text. An n-gram weight is computed for the n-gram extracted from the text. The n-gram weight may be computed by adjusting a term frequency of the n-gram. A relevancy score is computed for the tag using the n-gram weight and using an n-gram frequency of the canonical n-gram. The relevancy score is computed by dividing the n-gram weight by a value proportional to the n-gram frequency of the canonical n-gram. The relevancy score of the n-gram is presented.

In general, in one or more aspects, the disclosure relates to a system that dynamically extracts n-grams for automated vocabulary updates. The system includes a processor and an application executing on the processor to perform the steps below. Text is received. An n-gram extracted from the text is matched to a canonical n-gram from a vocabulary to identify a tag for the text. An n-gram weight is computed for the n-gram extracted from the text. The n-gram weight may be computed by adjusting a term frequency of the n-gram. A relevancy score is computed for the tag using the n-gram weight and using an n-gram frequency of the canonical n-gram. The relevancy score is computed by dividing the n-gram weight by a value proportional to the n-gram frequency of the canonical n-gram. The relevancy score of the n-gram is presented.

In general, in one or more aspects, the disclosure relates to a method that dynamically extracts n-grams for automated vocabulary updates. A set of historical data is selected that includes one or more conversations and search queries during a time window comprising a plurality of update intervals. A set of n-grams is extracted from the set of historical data for the time window. N-gram statistics are computed for the set of n-grams for the time window. Canonical statistics are calculated for a set of canonized n-grams generated from the set of n-grams for the time window. A mapping between the set of canonical n-grams and the set of n-grams is generated. The canonical statistics is presented with the set of canonized n-grams.

Other aspects of the invention will be apparent from the following description and the appended claims.

DETAILED DESCRIPTION

Figure 1:
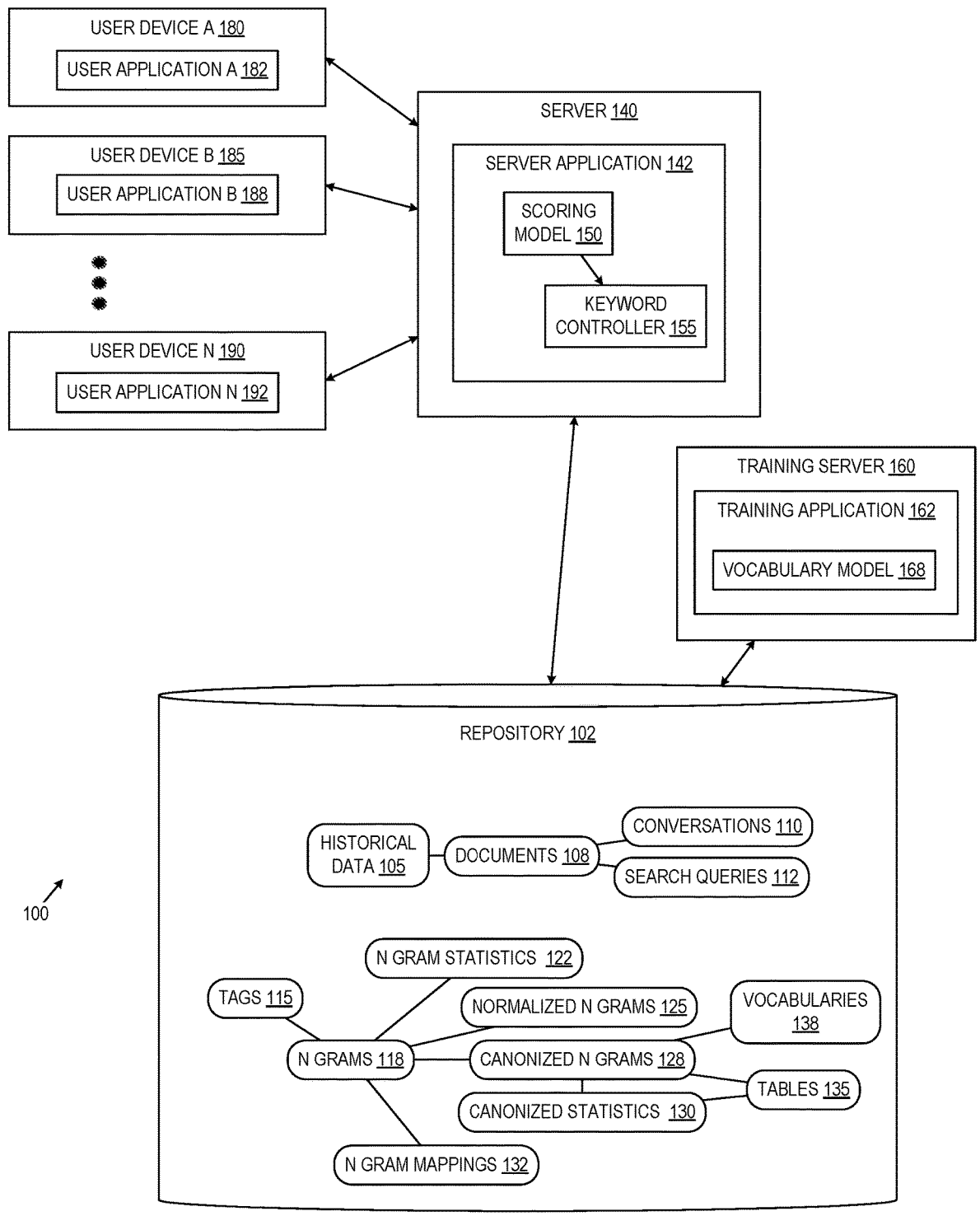
FIG. 1 shows diagrams of systems in accordance with disclosed embodiments.

Insights gained from customer contact history data may be used to monitor customer issues and take corresponding actions. With live offerings of software products and services, understanding customer needs and pain points in real time increases. From the perspective of the products and services, the purpose of the dynamic keyword tagging feature enabled by this disclosure extends a high level taxonomy of keywords to more granular resolution for downstream applications. The granular resolution allows for adapting and responding to customer needs rapidly and with the appropriate level of specificity.

Disclosed solutions focus on the design and operating mechanism of dynamic keyword extraction services used for multiple applications. To automate the keyword extraction task, systems of the disclosure autonomously identify up-to-date seasonal keywords and updates a master vocabulary on a regular basis. The master vocabulary is used to extract matching keywords at inference time. Disclosed embodiments not only save manual maintenance costs but also helps the system return timely keywords and avoiding outdated keywords.

In general, embodiments of the disclosure implement systems and methods for dynamically extracting n-grams for automated vocabulary updates. The automated vocabulary updates are used to extract n-grams and identify keywords for recent and real-time conversations with end users using the system. A dashboard provided by the system may display alerts to a user related to the trends of keywords detected in the end user conversations. In one embodiment, a user monitoring the dashboard may intervene in an end user call after receiving an alert for a particular keyword detected in a call.

The system records interactions with users, which include conversations, text messages, search queries, etc., which may be further processed by other machine learning models and processes. Periodically, the system extracts keywords identified with tags from the corpus of interactions (i.e., historical data) and updates the tags and keywords within vocabularies. The updated vocabularies are used to process recently received text to identify keywords that are relevant to recent interactions. The keywords may be displayed to users of the system. For example, end users may contact the system through phone calls that are transcribed in real time. The transcriptions are processed with the most recent vocabularies to identify keywords in the conversations, which may then be displayed to a user monitoring the system. The keywords may be displayed with statistics for users.

In one embodiment, the keywords are extracted as n-grams from the historical data and statistics are generated for the n-grams. The statistics may identify the frequency of different n-grams within the historical data. Different n-grams may relate to the same or similar concepts. To reduce the number of concepts being tracked by the system, the n-grams may be normalized and canonized. Normalization may involve changing the case of text and reordering words within n-grams. Canonization may involve selecting one n-gram from a group of n-grams that represent the same or similar concept to be identified as the canonized n-gram for the concept. Mappings are made that map between the n-grams (from the historical data) to the canonical n-grams. Tables are made to organize the statistics for the canonical n-grams, which may be used to process recently received text. The mappings, tables, in canonical n-grams are stored in a vocabulary. Different websites, different organizations, different users, etc., may have different vocabularies.

When the system receives text (from a conversation, a text message, search query, etc.), the system identifies the vocabulary for the text to process the text with the mapping of tables from the identified vocabulary. The system may tag the text to identify the n-grams that correspond to keywords within the text and weight the relevancy of the n-grams for the text. The weightings for the n-grams may be presented to a user or input to subsequent processes for further processing.

Turning to FIG. 1, the system (100) dynamically extracts n-grams and automatically updates vocabularies. As an example, an end user calls into the system (100) using the user device A (180) to get help with a service. The conversation is recorded by the system (100) and monitored by an operator using the user device N (190). The server (140) of the system (100) processes a transcript of the conversation using data in the repository (102) and the scoring model (150) to identify n-grams and generate relevancy scores for keywords from the conversation. The keyword controller (155) uses the n-grams and relevancy scores from the scoring model (150) to identify and present keywords to the user device N (190). For example, the operator using user device N (190) may use the keywords to receive alerts about the calls to the system (100). When certain keywords are received, the operator of the user device N (190) may intervene in a call.

Prior to the conversation, the system (100) uses the training application (162) to generate the vocabularies (138) that are stored in the repository (102) and used by the scoring model (150). The system (100) generates the vocabularies (138) with the vocabulary model (168) that processes the historical data (105) to generate n-grams and statistics for the vocabularies (138).

Figure 7A:
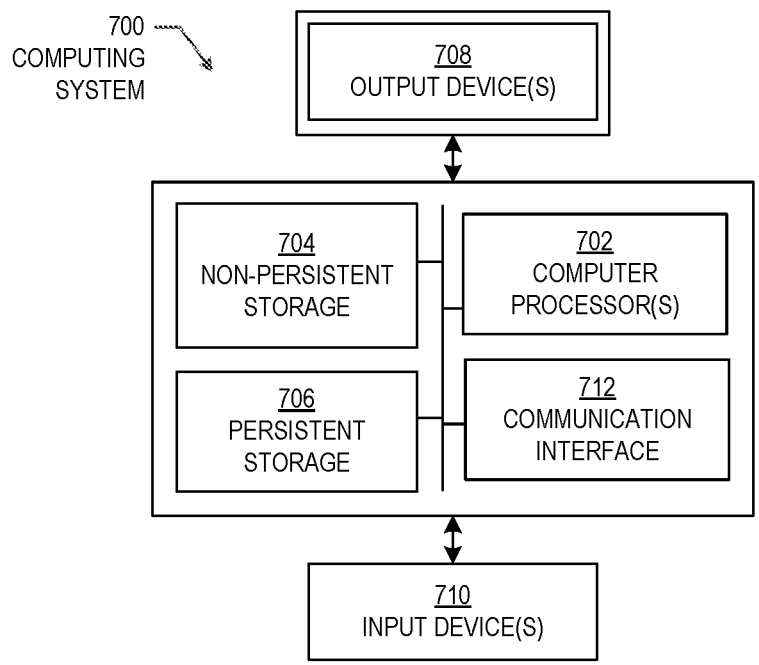
FIG. 7A and FIG. 7B show computing systems in accordance with disclosed embodiments.
Figure 7B:
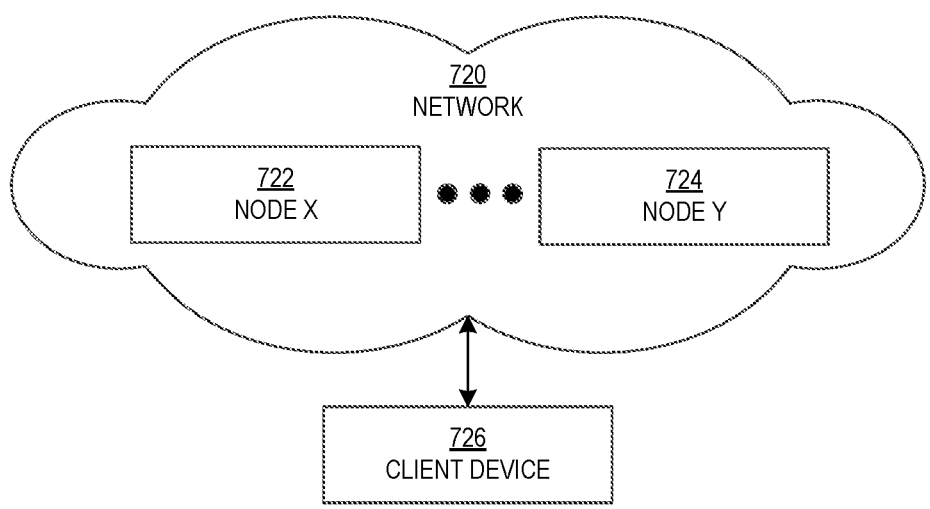

The system (100) includes a set of multiple interconnected computing systems, which may be implemented in a cloud computing environment and may be as described in FIG. 7A and 7B. The system (100) includes the repository (102), the server (140), the training server (160), and the user devices A (180) and B (185) through N (190).

The repository (102) is a computing system that stores information used by the system (100). The repository (102) includes the historical data A (105), the documents (108), the conversations (110), the search queries (112), the tags (115), the n-grams (118), the keywords (120), the n-gram statistics (122), the normalized n-grams (125), the canonized n-grams (128), the canonized statistics (130), the n-gram mappings (132), the tables (135), and the vocabularies (138).

The historical data A (105) is a record of the interactions of users with the system (100). Historical data A (105) may be partitioned into different sets. For example, an organization may provide multiple web applications and each web application may be associated with a set of interactions partitioned within the historical data A (105). The historical data A (105) includes the documents (108).

The documents (108) are records of individual interactions of users with the system (100). In one embodiment, the documents (108) are stored as text data, which may include transcriptions, messages, search queries, etc. The documents (108) include the conversations (110) and the search queries (112).

The conversations (110) are records of user conversations with the system (100). A conversation may be recorded as an audio file and transcribed to a text transcription file. In one embodiment, the conversations (110) may pertain to discussions of users with experts about using web application maintain by an organization and hosted by the server (140). For example, a user may receive help with a web application by placing a call and having a conversation with an expert in which the call is recorded and stored as one of the conversations (110).

The search queries (112) are records of user interactions with the system (100). A search query may be stored as a text string that is part of a request related to a topic and a web application hosted by an organization. For example, the query "how do I claim deductions with the tax return application?" identifies a topic ("claiming deductions") and a web application ("tax return application"). The search queries (112) may also include search queries received from a web page hosted by the server (140).

The tags (115) are data that include additional information about the text being processed by the system (100), including the text from the historical data A (105). The tags (115) are tags identified from the historical data A (105). For example, for one of the conversations (110), a set of the tags (115) may identify the participants of the conversation, timestamps for when utterances were made during the conversation, contact information for the users involved with the conversation, etc. The set of the tags (115) may also include tags that identify n-grams, and corresponding weights, that are found within the transcribed text of a conversation.

The n-grams (118) are sequences of "n" words, tokens, characters, etc., taken from an input text. Bigrams have two words and trigrams have three words. The n-grams (118) may be used with natural language processing and language modeling to identify the occurrence and frequency of words in an input text or corpus text, including the historical data A (105). The n-grams (118) are the n-grams identified from the historical data A (105) and enumerated by the tags (115).

The keywords (120) are sets of words from the historical data A (105). The keywords (120) identify and classify text within the historical data A (105). One of the keywords (120) may correspond to one of the n-grams (118) but an n-gram may not be a keyword. In one embodiment, the n-grams (818) are the possible sequences of words in a corpus and the keywords (120) are the relevant sequences of words in a corpus. Relevancy may be determined from the n-gram statistics (122).

The n-gram statistics (122) are statistics for the n-grams (118). The n-gram statistics (122) may identify the frequencies of individual n-grams within the historical data A (105), within individual ones of the documents (108), etc.

The normalized n-grams (125) are normalized versions of the n-grams (118). Normalization may include converting letters to lowercase, removing non-alphanumeric characters, removing stop words, stemming words within the n-grams, sorting words within the n-grams to ignore word ordering, etc.

The canonized n-grams (128) are canonized versions of the n-grams (118) and the normalized n-grams (125). Canonization may include selecting a variation of an n-gram based on the number of appearances of the n-gram in the historical data A (105), lemmatization (selection of an inflected form) of the words in the n-gram, etc.

The canonized statistics (130) are statistics for the canonized n-grams (128). The canonized statistics (130) may aggregate the n-gram statistics (122) for different n-grams that correspond to a single canonized n-gram.

The n-gram mappings (132) are mappings between the n-grams (118) and the canonized n-grams (128). The n-gram mappings (132) identify groups of the n-grams (118) that relate to the same or similar concept.

The tables (135) organize data about the statistics and n-grams calculated and identified by the system (100). In one embodiment, rows of the tables (135) may identify the canonized n-grams (128) and columns may identify the canonized statistics (130).

The vocabularies (138) identify sets of the canonized n-grams (128) used by the system (100). Different partitions of the historical data A (105) a correspond to different ones of the vocabularies (138). In one embodiment, the vocabularies (138) may be generated or updated periodically.

The server (140) is a computing system (further described in FIG. 7A). The server (140) may include multiple physical and virtual computing systems that form part of a cloud computing environment. In one embodiment, execution of the instructions, programs, and applications of the server (140) is distributed to multiple physical and virtual computing systems in the cloud computing environment. The server (140) may include the server application (142).

The server application (142) is a collection of programs with instructions that may execute on multiple servers of a cloud environment, including the server (140). The server application (142) is configured to process text using a vocabulary to generate relevancy scores and a keyword list. In one embodiment, the server application (142) hosts websites and may serve structured documents (hypertext markup language (HTML) pages, extensible markup language (XML) pages, JavaScript Object Notation (JSON) files and messages, etc.) to interact with the user devices A (180) and B (185) through N (190). Requests from the user devices A (180) and B (185) through N (190) may be processed to generate text used to generate relevancy scores and a keyword list. The server application (142) may include the scoring model (150) and the keyword controller (155).

The scoring model (150) is a collection of hardware and software components with programs and instructions that may operate on the server (140). The scoring model (150) processes text using a vocabulary to identify n-grams and generate relevancy scores.

The text processed by the scoring model may be generated from interaction with one of the user devices A (180) and B (185) through N (190). In one embodiment, the text processed by the scoring model is text transcribed from a conversation during a call from a user. In one embodiment, the text processed by the scoring model is a search query received from a user.

The vocabulary used by the scoring model (150) is one of the vocabularies (138) that is selected to be used to process text by the scoring model (150). The vocabulary selected is recently updated to contain relevant keywords.

The relevancy scores generated by the scoring model (150) are scores for the n-grams identified from the text. The n-grams correspond to canonized n-grams defined in the vocabulary used by the scoring model (150). In one embodiment, a relevancy score with larger values is indicative of an n-gram that is more meaningful to the text form which the n-gram is extracted than an n-gram with a lower relevancy score.

The keyword controller (155) is a collection of hardware and software components with programs and instructions that may operate on the server (140). The keyword controller (155) processes the relevancy scores from the scoring model (150) to generate lists of keywords.

A keyword list generated by the keyword controller (155) is a list of the keywords from a text, e.g., from a conversation. In one embodiment, the keyword list is sorted and truncated to include a threshold number of keywords (e.g., "5" keywords) having the largest relevancy scores.

The training server (160) is a computing system (further described in FIG. 7A). The training server (160) may include multiple physical and virtual computing systems that form part of a cloud computing environment. In one embodiment, execution of the instructions, programs, and applications of the training server (160) is distributed to multiple physical and virtual computing systems in the cloud computing environment. The training server (160) may include the training application (162). In one embodiment, the training server (160) and the server (140) may be embodied as a single computing system that operates both the server application (142) and the training application (162).

The training application (162) is a collection of programs with instructions that may execute on multiple servers of a cloud environment, including the training server (160). The training application (162) is configured to processes the historical data (105) using the vocabulary model (168) to generate a vocabulary of the master vocabularies (138).

The vocabulary model (168) is a collection of hardware and software components with programs and instructions that may operate on the training server (160). The vocabulary model (168) processes the sets of the historical data (105) to generate the vocabularies (138). For example, the vocabulary model (168) may extract n-grams, normalize the extracted n-grams, canonize the normalized n-grams, generates statistics, and generate mappings and tables for the n-grams and statistics.

The user devices A (180) and B (185) through N (190) are computing systems (further described in FIG. 7A). For example, the user devices A (180) and B (185) through N (190) may be desktop computers, mobile devices, laptop computers, tablet computers, server computers, etc. The user devices A (180) and B (185) through N (190) include hardware components and software components that operate as part of the system (100). The user devices A (180) and B (185) through N (190) communicate with the server (140) to access, manipulate, and view services and information hosted by the system (100). The user devices A (180) and B (185) through N (190) may communicate with the server (140) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (180) and B (185) through N (190) respectively include the user applications A (182) and B (188) through N (192).

The user applications A (182) and B (188) through N (192) may each include multiple programs respectively running on the user devices A (180) and B (185) through N (190). The user applications A (182) and B (188) through N (192) may be native applications, web applications, embedded applications, etc. In one embodiment, the user applications A (182) and B (188) through N (192) include web browser programs that display web pages from the server (140).

As an example, the user application A (182) may send a search query to the server (140) that is converted to text. The user application A (182) may receive a response that includes a list of keywords produced by the keyword controller (155).

Although shown using distributed computing architectures and systems, other architectures and systems may be used. In one embodiment, the server application (142) may be part of a monolithic application that performs image background removal. In one embodiment, the user applications A (182) and B (188) through N (192) may be part of monolithic applications that perform image background removal without the server application (142).

Figure 2A:
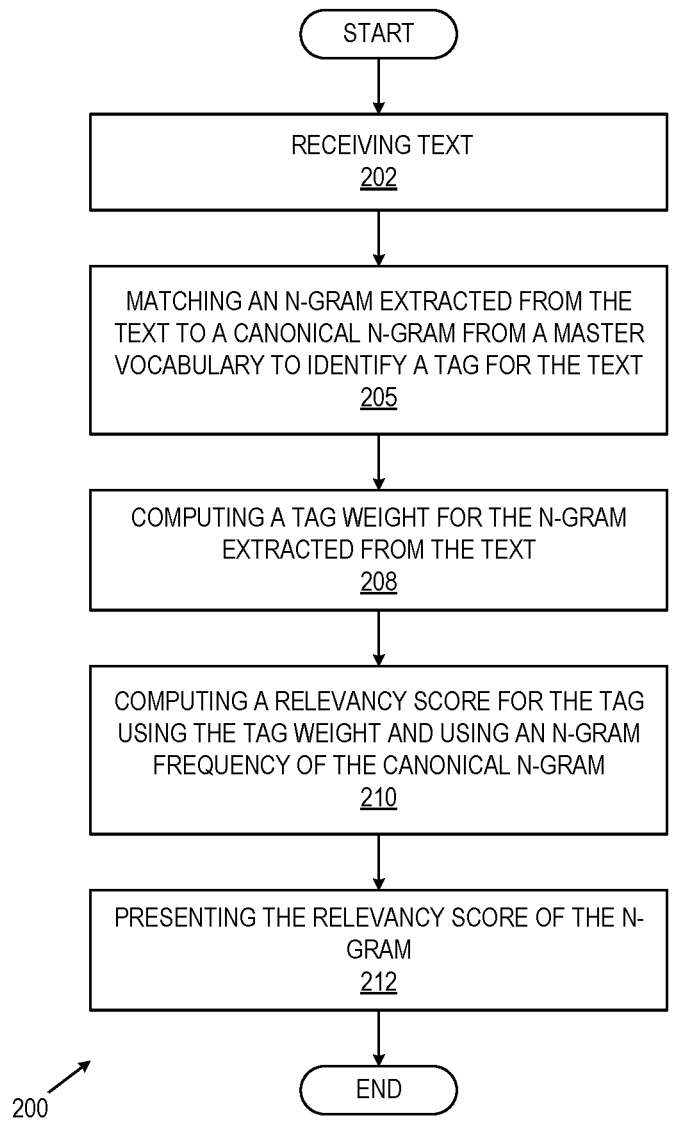
FIG. 2A and FIG. 2B show flowcharts in accordance with disclosed embodiments.

Turning to FIG. 2A, the process (200) dynamically extracts tags with automated vocabulary updates. The process (200) may be performed by a computing device interacting with one or more additional computing devices. For example, the process (200) may execute on a server response to one or more user devices.

At Step 202, text is received. The text may be from a document that includes a conversation or a search query. For example, user may initiate a call with a system that is transcribed to a document. The received text may include the entire document or a portion of the document. For example, as utterances are received and transcribed during a conversation, updates with transcribed text for recent utterances may be added to a document, and the added text transcribed from the utterances may form the received text that is then processed.

At Step 205, an n-gram extracted from the text is matched to a canonical n-gram from a vocabulary to identify a tag for the text. The canonical n-gram represents multiple n-grams that are to the same semantic concept. The vocabulary maintains a mapping between n-grams and canonical n-grams. In one embodiment, n-gram extracted from the text is matched to the canonical n-gram by comparing the n-gram extracted from the text to the n-grams presented by the canonical n-gram.

In one embodiment, the vocabulary is periodically updated to include data from a recent update interval and remove data from a previous update interval. For example, the update interval may be a monthly update interval with the recent update interval corresponding to the current month.

In one embodiment, the vocabulary may be generated using a time window for a group of update intervals. For example, time window may include twelve (12) update intervals that are each one month in duration so that the vocabulary is generated using one year of data.

In one embodiment, the n-gram extracted from the text is identified with an n-gram tag of a set of tags. The set of tags identify metadata of the text. In one embodiment, the metadata identified by the tags include n-gram identifiers, document identifiers, participant identifiers, and timestamp identifiers. The n-gram identifiers identify an n-gram (which is mapped to a canonical n-gram by the vocabulary). The document identifiers identify different documents from which text is processed by the system and may include documents for conversations and search queries. The participate identifiers identify the users that generate the text in the documents and may include an email address of the user. The timestamp identifiers may identify the time and date that the text in the document is generated.

At Step 208, an n-gram weight is computed for the n-gram extracted from the text. In one embodiment, the n-gram weight is a term frequency that measures the importance of a term (the n-gram) to a document in a collection or corpus. In one embodiment, the term frequency is calculated by counting the number of times a term appears in a document and dividing the count by the total number of terms in the document.

For the n-gram weight, the term frequency may be further adjusted. The adjustments may be used individually or in combination. For example, when the n-gram is a bigram or trigram, the n-gram weight may be adjusted with the equation below.

$$\text{adjusted weight} = \text{initial weight} * 3 + 1 \quad \text{Eq. 1}$$

Further, when the n-gram is from an utterance of a user (e.g., an end user using a web application), the n-gram weight may be adjusted using the equation below.

$$\text{adjusted weight} = \text{initial weight} * 4 \quad \text{Eq. 2}$$

In one embodiment, the tag is grouped with a set of tags corresponding to the canonical n-gram to combine a set of n-gram weights (which include the n-gram weight of the n-gram) to form a combined weight. The text being processed may include several different n-grams that may be normalized to the same normalized n-gram. The weights calculated for the different n-grams (corresponding to a single normalized n-gram) may be summed together to identify the combined weight for the normalized n-gram for the text. In one embodiment, the combined weight may be used instead of the n-gram weight to calculate a relevancy score.

In one embodiment, the set of tags correspond to the canonical n-gram by corresponding to a set of n-grams mapped to the canonical n-gram. Each tag is mapped to an n-gram. Different n-grams may be mapped to a canonical n-gram. The tags of the set of tags are mapped to n-grams of the set of n-grams, which are mapped to one canonical n-gram.

At Step 210, a relevancy score for the tag is computed using the n-gram weight and using an n-gram frequency of the canonical n-gram. In one embodiment, the relevancy score is computed with the equation below.

$$\text{relevancy score} = n\text{-gram weight}/\log 2(\text{canonical } n\text{-gram frequency}) \quad \text{Eq. 3}$$

The function "log2" is the logarithm function with a base of "2". In one embodiment, the canonical n-gram frequency is a term frequency for a canonical n-gram calculated by counting the number of times the n-grams mapped to a canonical n-gram appear in a corpus of multiple documents (e.g., historical data) and dividing the count by the total number of terms in the corpus of multiple documents.

At Step 212, the relevancy score is presented. The relevancy score may be presented by transmitting the relevancy score to a computing device. The computing device may display the relevancy score with the n-gram that corresponds to the relevancy score.

For example, the n-gram for the text "credit card" may be identified in a conversation and have a relevancy score of 0.89. The presentation of the text "credit card" may include the display of the text "credit card" with the text from other n-grams in which the font size of the text for each n-gram is based on relevancy score. The basis may be a proportional basis. As an example, the relevancy score of 0.89 may be the largest relevancy score of the n-grams being displayed and mapped to a font size of 20. Text for n-grams with lower relevancy scores may be mapped to a smaller font size.

In one embodiment, the n-gram is ranked within a set of n-grams extracted from the text using a maximum marginal relevance (MMR) algorithm and using an embedding vector for the n-gram. For example, an n-gram may be converted to a word vector using a pre-trained embedding model. A maximum marginal relevance algorithm may then rank the n-grams by the word vectors that correspond to the n-grams. Lower scores may be assigned to n-grams with word vectors that are similar to other word vectors of n-grams that are already highly ranked to redundancy in the results.

In one embodiment, a threshold number of n-grams are selected using the relevancy score. For example, a threshold of five (5), the n-grams with the five highest relevancy scores may be selected and included in an n-gram list, which may be presented to and displayed by a user device.

In one embodiment, the relevancy score is presented and identifies the n-gram as a keyword of the text. For example, an n-gram list may be generated that identifies the n-grams from the text along with the corresponding relatively scores. The n-grams and relevancy scores may be used as input to further processes (e.g., machine learning models) and may be displayed on a user device.

Figure 2B:
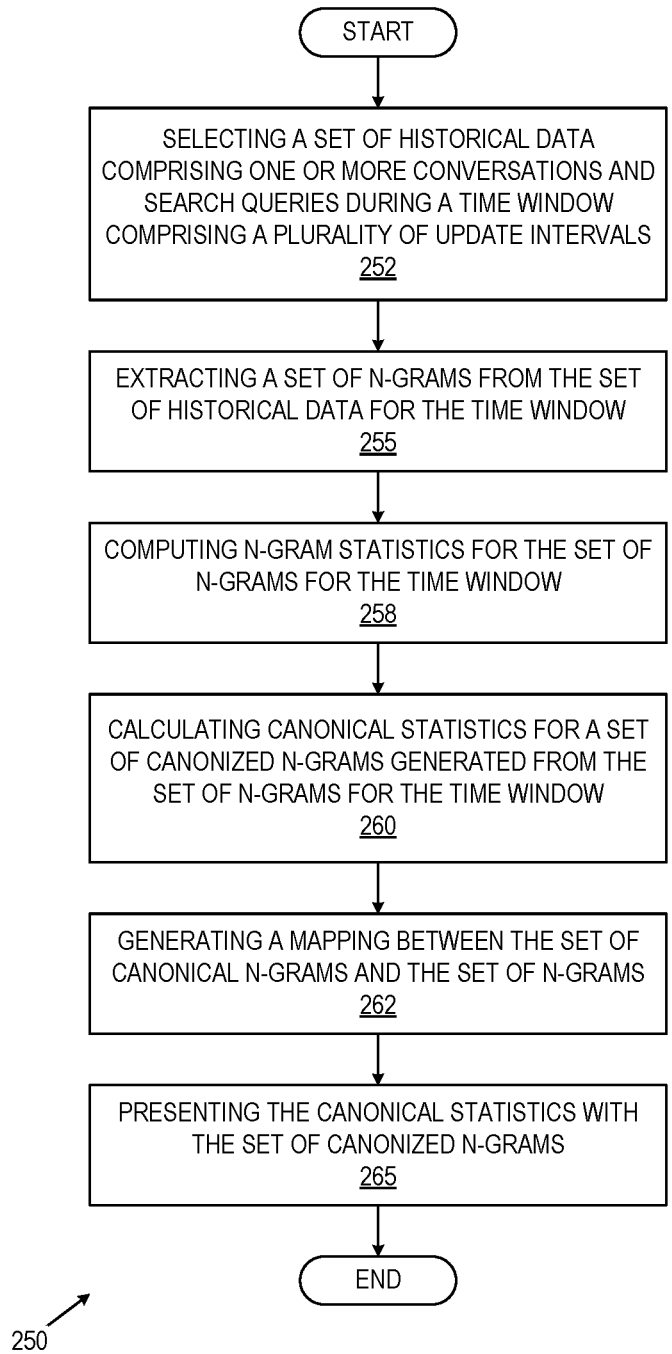

Turning to FIG. 2B, the process (250) automatically updates vocabularies. The process (250) may be performed by a computing device interacting with one or more additional computing devices. For example, the process (250) may execute on a server response to one or more user devices.

At Step 252, a set of historical data is selected that may include conversations and search queries generated during a time window that includes multiple update intervals. For example, my window may be a one year time window that includes update intervals that are one month in length. Different durations of time may be used for the time window (six months, two years, etc.) and for the update interval (quarterly, six months, etc.).

In one embodiment, the update intervals that form the time window do not include a previous update interval for a previous set of historical data. For example, at the end of update interval, the oldest update interval (i. e., a previous update interval) may be removed from the time window and the most recent update interval added to the time window so that the historical data being processed includes the most recent year of data.

At Step 255, a set of n-grams are extracted from the set of historical data for the time window. In one embodiment, the set of n-grams may include unigrams (one word), bigrams, and trigrams.

In one embodiment, non-informative n-grams are removed from the set of n-grams. For example, unigrams for the word "the", which may not serve to identify the semantic meaning of text in the historical data, may be removed.

In one embodiment, the set of n-grams is normalized to form a set of normalized n-grams. Normalization may include converting letters to lowercase, removing non-alphanumeric characters, removing stop words, stemming words within the n-grams, sorting words within the n-grams to ignore word ordering (e.g., "password reset" and "reset password" may be normalized as "password reset"), etc.

In one embodiment, the set of normalized n-grams is canonized using n-gram statistics to form a set of canonized n-grams. In one embodiment, multiple n-grams may normalize to the same normalized n-grams and the n-gram with the largest number of appearances in the historical data may be selected to be the canonized n-gram for the n-grams that normalize to the same normalized n-gram. Each canonized n-gram may represent a different semantic concept within the historical data.

At Step 258, n-gram statistics or computed for the set of n-grams for the time window. In one embodiment, the n-gram statistics include the term frequency and inverse document frequency for each of the n-grams, normalized n-grams, and canonize n-grams for the historical data.

In one embodiment, the n-gram statistics includes a query number for each n-gram identifying a number of the search queries in the set of historical data that used the n-gram. The n-gram statistics may further include an n-gram number, of a set of n-gram numbers, that identifies a number of times an n-gram appears in the conversations of the set of historical data. The n-gram statistics may further include a conversation number, of a set of conversation numbers, that identifies a number of conversations in which the n-gram of the n-gram number appears in one of the conversations.

At Step 260, canonical statistics are calculated for a set of canonized n-grams generated from the set of n-grams for the time window. In one embodiment, the canonical statistics includes a canonical n-gram frequency, of a set of canonical n-gram frequencies, identifying a frequency of a canonical n-gram in each document of the set of historical data, in which a document may be one of a conversation and a search query.

At Step 262, generating a mapping between the set of canonical n-grams and the set of n-grams. One canonical n-gram may be mapped to multiple n-grams and one n-gram may be mapped to one canonical n-gram.

In one embodiment, a table is generated that includes rows for the canonical n-grams and columns for the canonical statistics. The table organizes the n-grams and corresponding statistics and may be presented to and displayed by a user device.

At Step 265, the canonical statistics are presented with the set of canonized n-grams. Presentation of the canonical statistics may include multiple graphs. In one embodiment, one of the graphs may display changes to the frequencies of the economical n-grams. In one embodiment, one of the graphs may display text of the canonical n-grams in a size that is proportional to a statistic (e.g., term frequency) for the canonical n-gram.

Figure 3A:
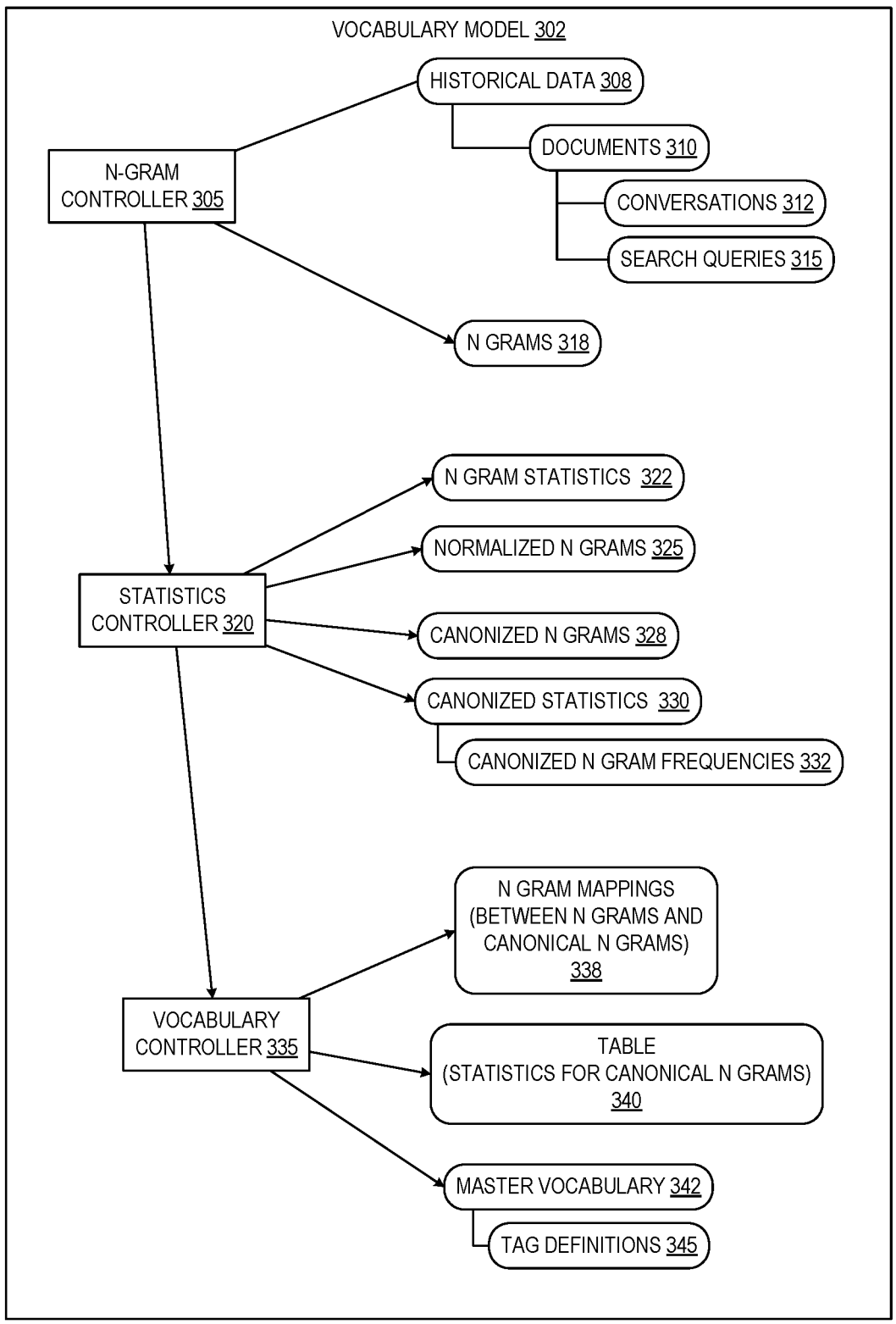
FIG. 3A, FIG. 3B, FIG. 4A, FIG. 4B, FIG. 4C, FIG. 5, and FIG. 6 show examples in accordance with disclosed embodiments.

Turning to FIG. 3A, the vocabulary model (302) is a set of computer hardware and software components that process the historical data (308) to generate the vocabulary (342). In one embodiment, the vocabulary model (302) may be part of a server application. The vocabulary model (302) uses the n-gram controller (305), the statistics controller (320), and the vocabulary controller (335) to process the historical data (308) and generate the vocabulary (342).

The n-gram controller (305) is a component of the vocabulary model (302). The n-gram controller (305) processes the historical data (308) and generates the n-grams (318). In one embodiment, the n-gram controller (305) filters the historical data (308) to identify the documents (310) for a time window. The time windows specifies when the documents (310) are created. The historical data (308) is a corpus of text data that includes the documents (310). The documents (310) may include conversations (312) and the search queries (315). In one embodiment, the conversations (312) include transcriptions of calls of users of a web application asking for help with the web application. In one embodiment, the search queries (315) include queries submitted by a user submitted near the time of a call. For example, the search queries (315) may include queries generated by the user within 10, 20, 30 minutes, etc., of the call by the user. In one embodiment, the n-grams (318) include each of the n-grams present in the documents (310).

The statistics controller (320) is another component of the vocabulary model (302). The statistics controller (320) further processes the n-grams (318) and the documents (310) to generate the n-gram statistics (322) and the normalized n-grams (325). The n-gram statistics (322) may include the term frequencies and inverse document frequencies for the n-grams (318). The normalized n-grams (325) are a subset of the n-grams (318). After normalization, the statistics controller (320) generates the canonized n-grams (328) from the normalized n-grams (325), and generates the canonized statistics (330) for the canonized n-grams (328). The canonized statistics (330) includes the canonized n-gram frequencies (332). In one embodiment, the canonized n-gram frequencies (332) include term frequencies and inverse document frequencies for the canonized n-grams (328) in relation to the documents (310).

The vocabulary controller (335) is another component of the vocabulary model (302). The vocabulary controller (335) processes outputs from the statistics controller (320) to generate the vocabulary (342), which may include the n-gram mappings (338) and the table (340). The n-gram mappings (338) are mappings between the canonized n-grams (328) and the n-grams (318). The table (340) is a data structure organizing the canonized n-grams (328) and the canonized statistics (330). The vocabulary (342) includes the tag definitions (345). In one embodiment, the tag definitions (345) enumerate the n-grams (318), the normalized n-grams (325), the canonized n-grams (328), and the relationships therebetween.

Figure 3B:
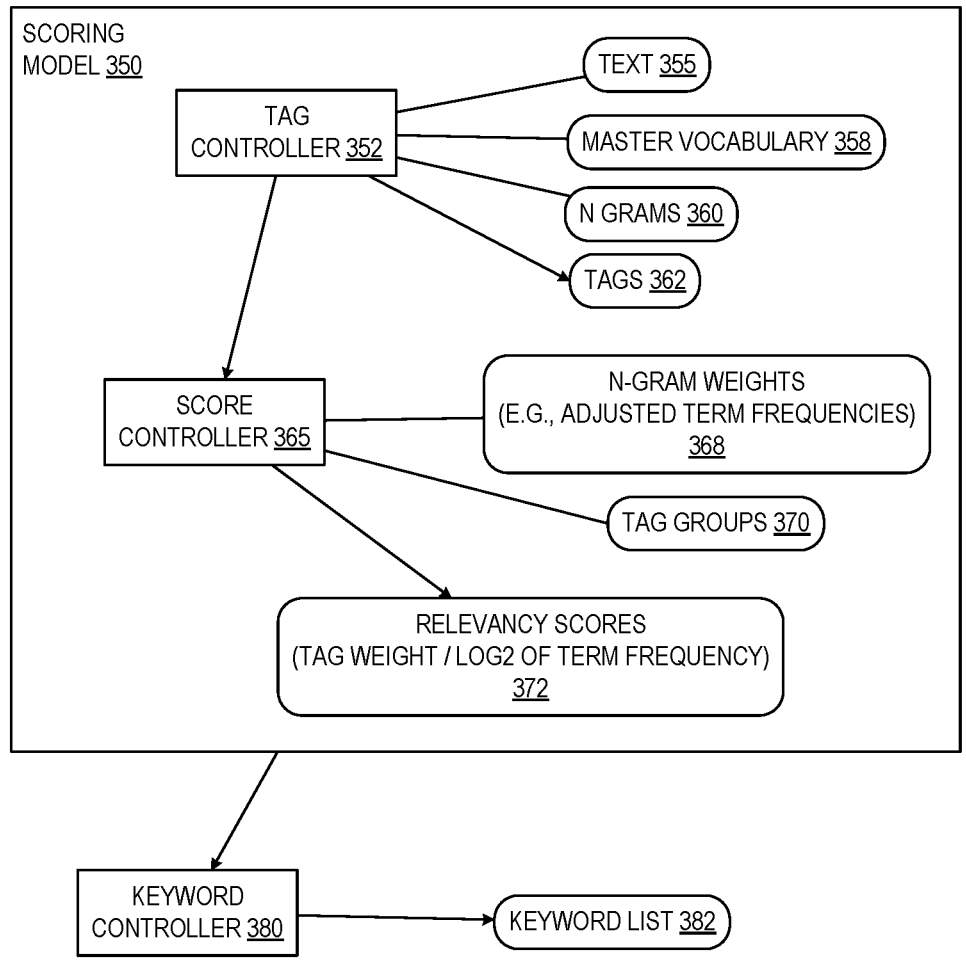

Turning to FIG. 3B, the scoring model (350) is a set of computer hardware and software components that process the text (355) to generate the relevancy scores (372) and the keyword controller (380) process the output of the scoring model (350) to generate the keyword list (382). In one embodiment, the scoring model (350) may be part of a server application. The scoring model (350) uses the tag controller (352), and the score controller (365) to process the text (355) and generate the relevancy scores (372).

The tag controller (352) is a component of the scoring model (350). The tag controller (352) processes the text (355) using the vocabulary (358) to generate the n-grams (360) and the tags (362). The tags (362) identify metadata of the text (355) and includes tags for the n-grams (360), participant identifiers, timestamp identifiers, etc.

The score controller (365) is a component of the scoring model (350). The score controller (365) processes the n-grams (360) and the tags (362) to generate the n-gram weights (368). In one embodiment, the n-gram weights (368) are generated from the term frequencies of the n-grams (360) and adjusted by whether an n-gram is from an utterance by a user and adjusted based on the number of words in an n-gram. The n-gram weights (368) are collected into the tag groups (370) for tags that normalize to the same normalized tag. The weights of tags in a tag group may be summed together to form a combined weight used to generate one of the relevancy scores (372). The relevancy scores (372) are generated by combining the n-gram weights (368) of the n-grams (360) with the term frequencies of the n-grams (360).

The keyword controller (380) is a set of computer hardware and software components that process outputs of the scoring model (350) to generate the keyword list (382). In one embodiment, the keyword list (382) is a list of a threshold number of the n-grams (360) sorted by the relevancy scores (372).

Figure 4A:
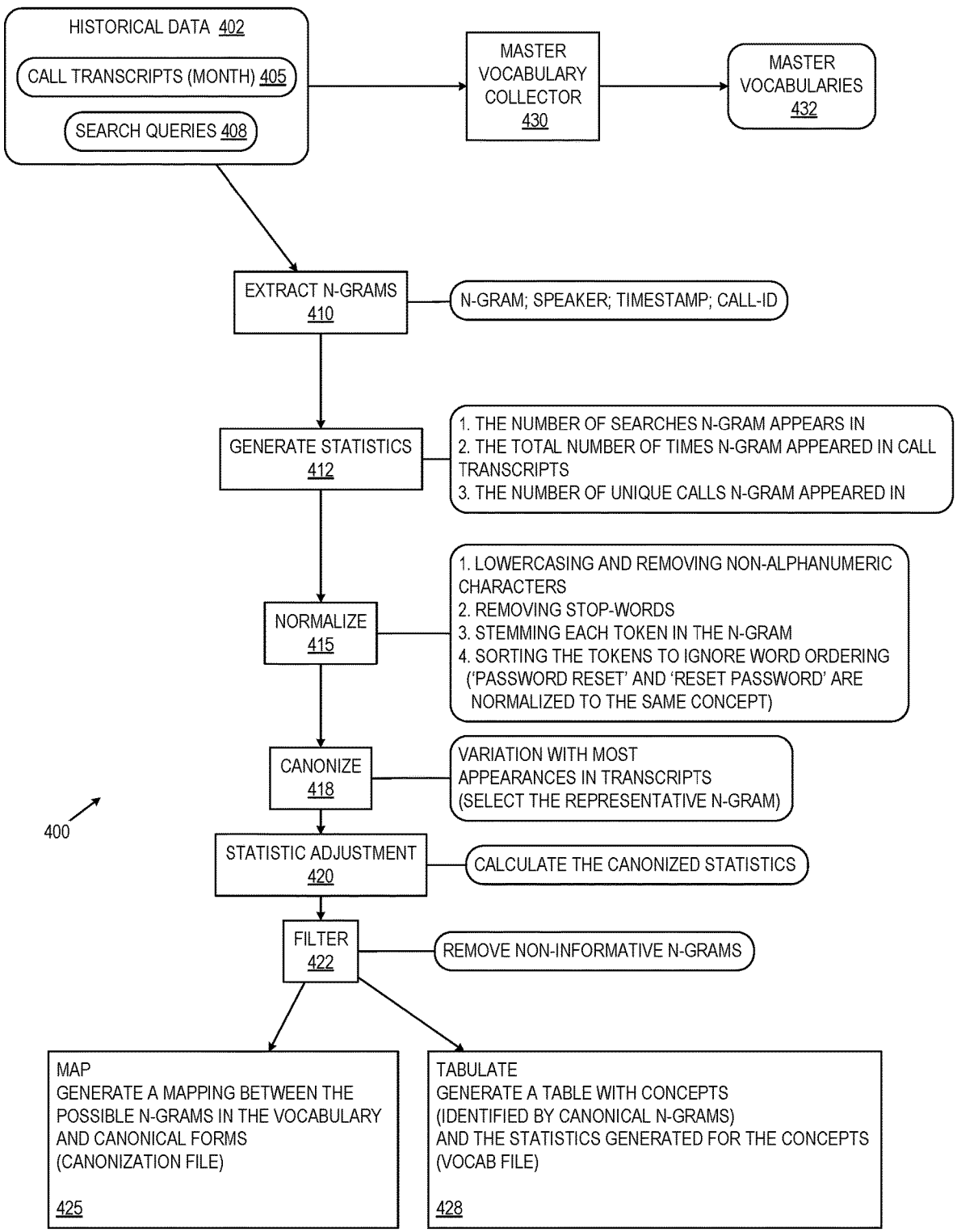
Figure 4B:
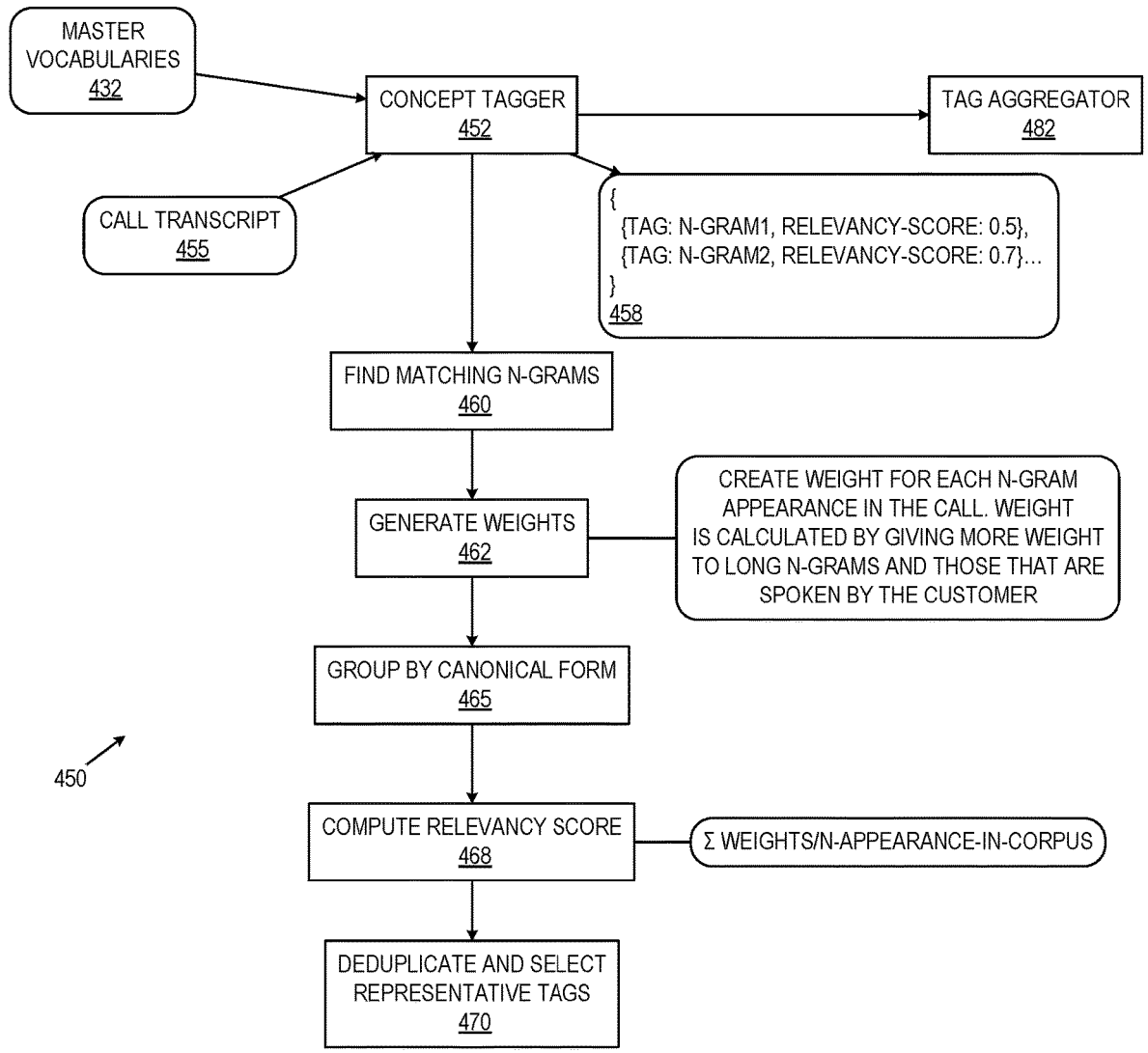
Figure 4C:
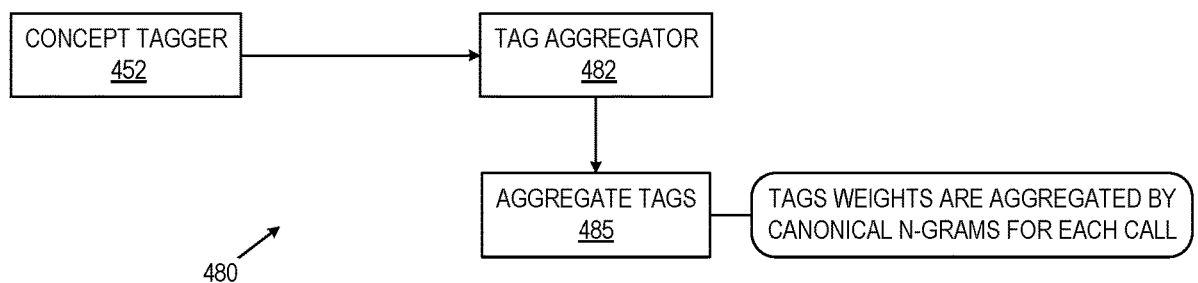

FIG. 4A, FIG. 4B, and FIG. 4C illustrate the process (400), the process (450), and the process (480) for generating vocabularies, using vocabularies to generate n-gram weights, and aggregating n-gram weights. The process (400), the process (450), and the process (480) operate on one or more computing systems.

Turning to FIG. 4A, the process (400) processes the historical data (402) to generate the vocabulary is (432). The historical data (402) includes one month of call data and search queries relating to a web service that is used by the users and for which the calls (for the call transcripts (405)) and the search queries (408) are initiated and requested. In one embodiment, the process (400) may be executed by the vocabulary collector (430).

At Step 410, n-grams are extracted from the historical data (402). The n-grams may be extracted by tagging the historical data (402). Tagging the historical data (402) includes tagging the historical data (402) for n-grams, speaker identifiers, timestamps, caller identification data, etc.

At Step 412, statistics are generated for the historical data (402) based on the n-grams. The statistics may include statistics for the number of searches in which an n-grams appear, the total number of times n-grams appear in call transcripts, the number of unique calls in which n-grams appear, etc.

At Step 415, the n-grams identified from the historical data (402) are normalized. Normalization may include converting characters to lowercase and removing nonalphanumeric characters, removing stop words, stemming the words or tokens in the n-grams, and sorting the tokens within the n-gram to ignore word ordering.

At Step 418, the normalized and grams are canonized. Canonization may involve selecting an n-gram that is a variation of a normalized n-gram with the largest number of appearances in the historical data (402) as the representative n-gram for the n-grams that normalize to the same normalized n-gram. For example, the n-gram "password reset" and the n-gram "reset password" both normalize to the normalized n-gram "password reset" when the normalization algorithm sorts the words of the n-grams by alphabetical order. If the n-gram "password reset" occurs in the historical data (402) less often than the n-gram "reset password", then the n-gram "reset password" may be identified as the canonized n-gram ("reset password") for the normalized n-gram "password reset" that corresponds to the n-gram "password reset" and the n-gram "reset password".

At Step 420, statistics are adjusted. The adjustment of the statistics may include generating canonized statistics for the canonized n-grams identified for the historical data (402). The canonized statistics may include statistics proportional to the term frequency and inverse document frequency of the canonized n-grams with respect to the historical data (402), the call transcripts (405), and the search queries (408).

At Step 422, the n-grams are filtered. In one embodiment, the n-grams that are non-informative are removed.

At Step 425, mappings are generated. The mappings identify the canonized n-grams for the n-grams generated from the historical data (402).

At Step 428, the data is tabulated. In one embodiment, the tabulation generates a table with rows for canonized n-grams and columns for statistics for the canonized n-grams.

The vocabulary collector (430) generates the n-grams and corresponding statistics. After generating the n-grams and corresponding statistics, the vocabulary collector (430) may encapsulate the n-grams and statistics into the vocabularies (432), which may be transmitted to the concept tagger (452) of FIG. 4B.

Turning to FIG. 4B, the process (450) executes on the concept tagger (452) to process the call transcript (455) with the vocabularies (432) to generate the tags (458). In one embodiment, the call transcript (455) is a transcript of a call received by a system from a user requesting help with the use of a web service. The tags (458) are generated with the process (450) and enumerate the n-grams and relevancy scores identified from the call transcript (455).

At Step 460, matching n-grams are found. In one embodiment, the concept tagger (452) identifies n-grams from the call transcript (455) and matches the n-grams from the call transcript (455) to the n-grams from one of the vocabularies (432).

At Step 462, weights are generated. Weights may be generated for each of the n-grams identified in the call transcript (455). The weights may be adjusted by giving more weight to longer and grams and to n-grams that correspond to utterances spoken by a user that is an end user using a web service.

At Step 465, the n-grams are grouped by canonical form. The canonical forms are retrieved from one of the vocabularies (432) and then applied to the n-grams identified from the call transcript (455) to identify the groups of n-grams for the call transcript (455).

At Step 468, relevancy scores are computed. In one embodiment, the relevancy scores are computed by performing a summation of the adjusted weight of a canonical n-gram divided by the number of appearances of the canonical n-gram in the original text corpus (i.e., the historical data (402) of FIG. 4A).

At Step 470, n-grams are deduplicated and representative tags are selected. In one embodiment, a maximum marginal relevance algorithm is applied to the relevancy scores to cull duplicative n-grams and select tags for the n-grams that correspond to the semantic meaning of the call transcript (455). After executing the process (450), the tags (458) may be transmitted to the tag aggregator (482) of FIG. 4C.

Turning to FIG. 4C, the process (480) executes on the tag aggregator (482). The tag aggregator (482) receives outputs from the concept tagger (452) (e.g., the tags (458) of FIG. 4B) and performs Step 485 to aggregate the tags. In one embodiment, the weights for the tags are aggregated by the canonical n-grams for each call. For example, the relevancy scores of tags for the n-grams "password reset" and "reset password" may be added together with one of the tags being removed from the list of tags.

Figure 5:
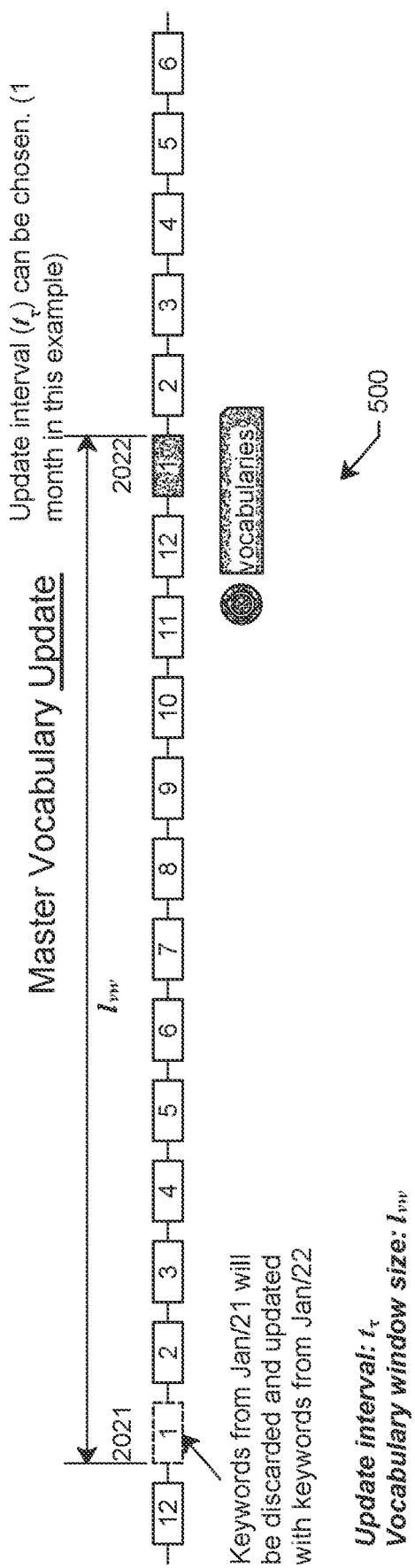

Turning to FIG. 5, the diagram (500) illustrates an example of the timing of updates to a vocabulary. For example, a magic vocabulary may be generated for a window size of twelve months that includes twelve one-month update intervals. The update interval for January 2021 is removed from the window and the update info for January 2022 is added to the window to generate a vocabulary for January of 2022 with data that stretches back to February of 2021.

Figure 6:
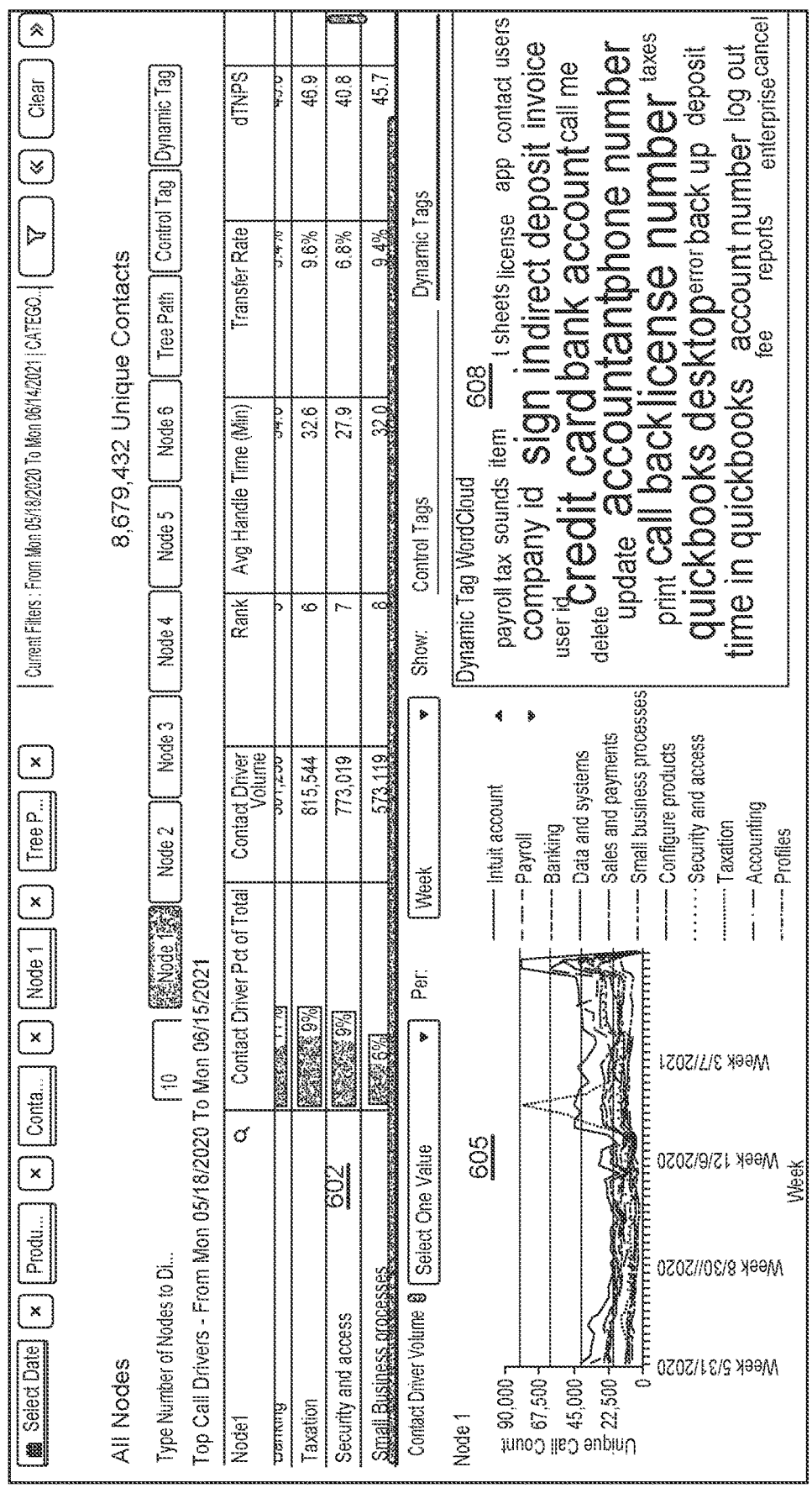

Turning to FIG. 6, the user interface (600) displays tables and graphs of n-grams and statistics. The n-grams and statistics or for a vocabulary generated for the time window of May 18, 2020, to Jun. 14, 2021. The user interface (600) includes the table (602), the usage graph (605), and the word graph (608). The user interface (600) indicates that 8,679,432 unique contacts were made with the system. In one embodiment, the unique contacts include calls and search queries received by the system.

The table (602) is a user interface element displayed within the user interface (600). The table (602) includes rows that identify the text of canonical n-grams and columns for statistics for the canonical n-grams identified by the rows for the time window of the vocabulary.

The usage graph (605) is a user interface element displayed within the user interface (600). The usage graph (605) illustrates the usage of canonical n-grams in calls during the weeks during the time window of the vocabulary.

The word graph (608) is a user interface element displayed within the user interface (600). The word graph (608) displays the words of the canonical n-grams for the time window of the vocabulary. The size of the words in the word graph (608) may be proportional to the scores or statistics of the words. The colors of the words in the word graph (608) may be proportional to the meaning of the words in which words of similar concepts and semantic meaning may have similar colors, which may be determined by the distance between the word vectors for corresponding words.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704), persistent storage (706), a communication interface (712) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) (702) may be one or more cores or micro-cores of a processor. The computer processor(s) (702) includes one or more processors. The one or more processors may include a central processing unit (CPU), a graphics processing unit (GPU), a tensor processing unit (TPU), combinations thereof, etc.

The input device(s) (710) may include a touchscreen, keyboard, mouse, microphone, touchpad, electronic pen, or any other type of input device. The input device(s) (710) may receive inputs from a user that are responsive to data and messages presented by the output device(s) (708). The inputs may include text input, audio input, video input, etc., which may be processed and transmitted by the computing system (700) in accordance with the disclosure. The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the output device(s) (708) may include a display device, a printer, external storage, or any other output device. One or more of the output devices may be the same or different from the input device(s). The input and output device(s) may be locally or remotely connected to the computer processor(s) (702). Many different types of computing systems exist, and the aforementioned input and output device(s) may take other forms. The output device(s) (708) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a computer program product that includes a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include and/or perform all or a portion of one or more embodiments of the invention.

The computing system of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, "or" is an "inclusive or" and, as such includes "and." Further, items joined by an or may include any combination of the items with any number of each item unless expressly stated otherwise.

The figures of the disclosure show diagrams of embodiments that are in accordance with the disclosure. The embodiments of the figures may be combined and may include or be included within the features and embodiments described in the other figures of the application. The features and elements of the figures are, individually and as a combination, improvements to the technology of keyword extraction using tags and n-grams. The various elements, systems, components, and steps shown in the figures may be omitted, repeated, combined, and/or altered as shown from the figures. Accordingly, the scope of the present disclosure should not be considered limited to the specific arrangements shown in the figures.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method, comprising:
   receiving text;
   matching an n-gram extracted from the text to a canonical n-gram from a vocabulary to identify a tag for the text;
   computing an n-gram weight for the n-gram extracted from the text, wherein the n-gram weight is computed by adjusting a term frequency of the n-gram;
   computing a relevancy score for the tag using the n-gram weight and using an n-gram frequency of the canonical n-gram, wherein the relevancy score is computed by dividing the n-gram weight by a value proportional to the n-gram frequency of the canonical n-gram; and
   presenting the relevancy score of the n-gram.

2. The method of claim 1, further comprising:
   ranking the n-gram within a set of n-grams extracted from the text using a maximum marginal relevance algorithm and using an embedding vector for the n-gram.

3. The method of claim 1, further comprising:
   grouping the tag with a set of tags corresponding to the canonical n-gram to combine a set of n-gram weights comprising the n-gram weight to form a combined weight, wherein the set of tags correspond to a set of n-grams mapped to the canonical n-gram; and
   computing the relevancy score using the combined weight for the n-gram weight.

4. The method of claim 1, further comprising:
   selecting a threshold number of n-grams using the relevancy score; and
   presenting the relevancy score identifying the n-gram as a keyword of the text.

5. The method of claim 1, wherein the vocabulary is periodically updated to include data from a recent update interval and remove data from a previous update interval, wherein the n-gram is identified with an n-gram tag of a set of tags that identify metadata of the text, wherein the metadata comprises n-gram identifiers, document identifiers, participant identifiers, and timestamp identifiers.

6. The method of claim 1, wherein the vocabulary is updated by:
selecting a set of historical data comprising one or more conversations and search queries during a time window comprising a plurality of update intervals;
extracting a set of n-grams from the set of historical data for the time window;
computing n-gram statistics for the set of n-grams for the time window;
calculating canonical statistics for a set of canonized n-grams generated from the set of n-grams for the time window;
generating a mapping between the set of canonical n-grams and the set of n-grams; and
presenting the canonical statistics with the set of canonized n-grams.

7. The method of claim 6, further comprising:
computing the n-gram statistics comprising:
a query number identifying a number of the search queries in the set of historical data,
an n-gram number of a set of n-gram numbers identifying a number of times the n-gram appears in the conversations of the set of historical data, and
a conversation number of a set of conversation numbers identify a number of conversations in which the n-gram of the n-gram number appears.

8. The method of claim 6, further comprising:
calculating the canonical statistics comprising a canonical n-gram frequency of a set of canonical n-gram frequencies identifying a frequency of the canonical n-gram in each document of the set of historical data, wherein a document is one of a conversation and a search query.

9. The method of claim 6, further comprising:
generating a table comprising rows for the canonical n-grams and columns for the canonical statistics.

10. The method of claim 6, further comprising:
canonizing the set of normalized n-grams using the n-gram statistics to form a set of canonized n-grams.

11. A system comprising:
a processor;
an application executing the processor and configured for:
receiving text;
matching an n-gram extracted from the text to a canonical n-gram from a vocabulary to identify a tag for the text;
computing an n-gram weight for the n-gram extracted from the text, wherein the n-gram weight is computed by adjusting a term frequency of the n-gram;
computing a relevancy score for the tag using the n-gram weight and using an n-gram frequency of the canonical n-gram, wherein the relevancy score is computed by dividing the n-gram weight by a value proportional to the n-gram frequency of the canonical n-gram; and
presenting the relevancy score of the n-gram.

12. The system of claim 11, wherein the application is further configured for:
ranking the n-gram within a set of n-grams extracted from the text using a maximum marginal relevance algorithm and using an embedding vector for the n-gram.

13. The system of claim 11, wherein the application is further configured for:
grouping the tag with a set of tags corresponding to the canonical n-gram to combine a set of n-gram weights comprising the n-gram weight to form a combined weight, wherein the set of tags correspond to a set of n-grams mapped to the canonical n-gram; and
computing the relevancy score using the combined weight for the n-gram weight.

14. The system of claim 11, wherein the application is further configured for:
selecting a threshold number of n-grams using the relevancy score; and
presenting the relevancy score identifying the n-gram as a keyword of the text.

15. The system of claim 11, wherein the vocabulary is periodically updated to include a recent update interval and remove a previous update interval, wherein the n-gram is identified with an n-gram tag of a set of tags that identify metadata of the text, wherein the metadata comprises n-gram identifiers, document identifiers, participant identifiers, and timestamp identifiers.

16. The system of claim 11, wherein the vocabulary is updated by:
selecting a set of historical data comprising one or more conversations and search queries during a time window comprising a plurality of update intervals;
extracting a set of n-grams from the set of historical data for the time window;
computing n-gram statistics for the set of n-grams for the time window;
calculating canonical statistics for a set of canonized n-grams generated from the set of n-grams for the time window;
generating a mapping between the set of canonical n-grams and the set of n-grams; and presenting the canonical statistics with the set of canonized n-grams.

17. The system of claim 16, wherein the application is further configured for:
computing the n-gram statistics comprising:
a query number identifying a number of the search queries in the set of historical data,
an n-gram number of a set of n-gram numbers identifying a number of times the n-gram appears in the conversations of the set of historical data, and
a conversation number of a set of conversation numbers identify a number of conversations in which the n-gram of the n-gram number appears.

18. The system of claim 16, wherein the application is further configured for:
calculating the canonical statistics comprising a canonical n-gram frequency of a set of canonical n-gram frequencies identifying a frequency of the canonical n-gram in each document of the set of historical data, wherein a document is one of a conversation and a search query.

19. The system of claim 16, wherein the application is further configured for:
generating a table comprising rows for the canonical n-grams and columns for the canonical statistics.

20. A method, comprising:
selecting a set of historical data comprising one or more conversations and search queries during a time window comprising a plurality of update intervals;
extracting a set of n-grams from the set of historical data for the time window;
computing n-gram statistics for the set of n-grams for the time window;

calculating canonical statistics for a set of canonized n-grams generated from the set of n-grams for the time window;
generating a mapping between the set of canonical n-grams and the set of n-grams; and
presenting the canonical statistics with the set of canonized n-grams.

\* \* \* \* \*